March 29, 1932.  J. AVERY  1,851,886
CLINOMETER
Filed May 7, 1930
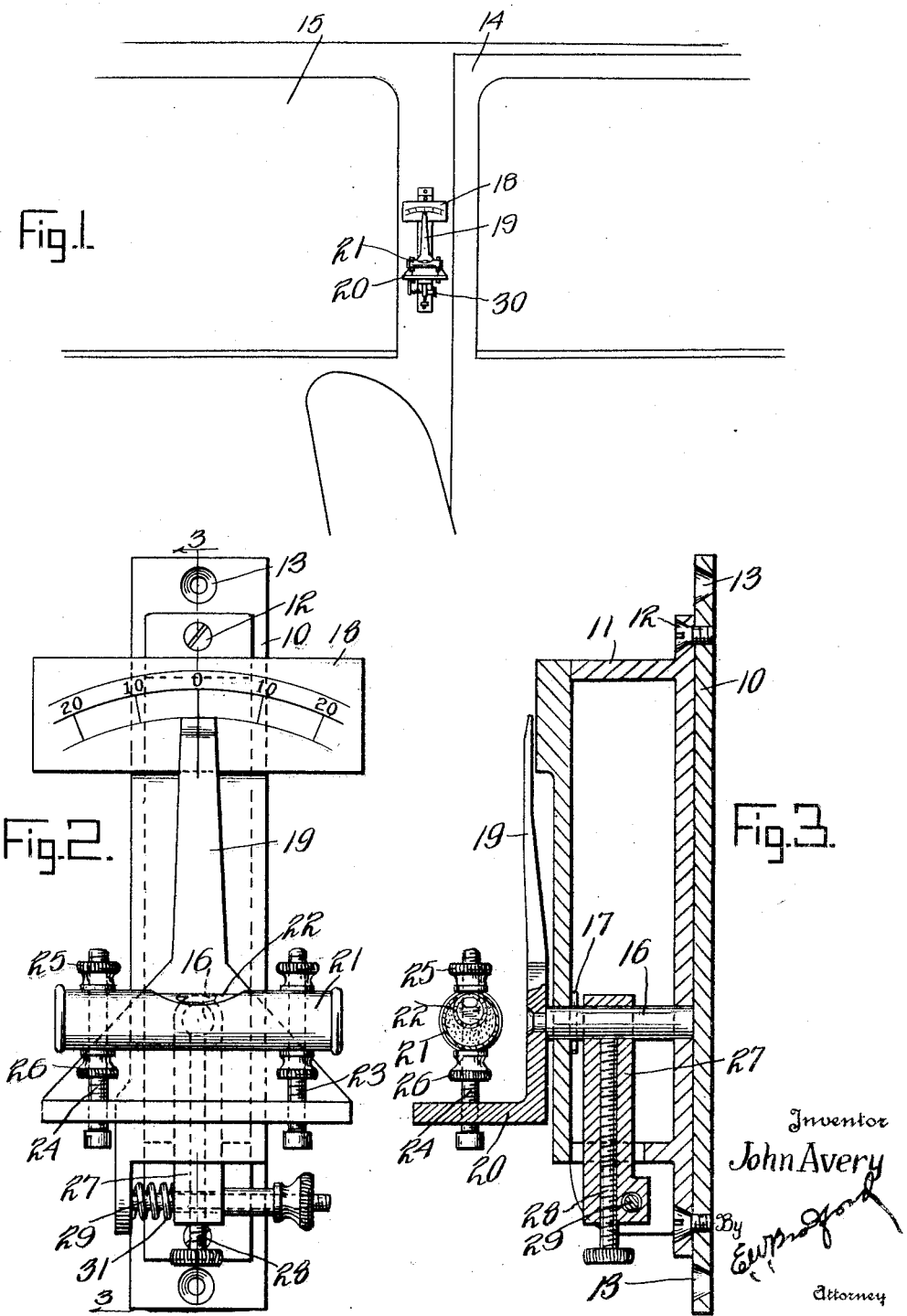
Inventor
John Avery
By E.W. Bradford
Attorney Patented Mar. 29, 1932

1,851,886

UNITED STATES PATENT OFFICE

JOHN AVERY, OF NEW LEXINGTON, OHIO

CLINOMETER

Application filed May 7, 1930. Serial No. 450,514.

This invention relates to devices for quickly determining the grade of a road by an engineer in making a preliminary survey of the road and may be called a highway clinometer.

An object of the invention is to provide a device for this purpose which is simple and which will enable an engineer to get the approximate percentage of the grade or the number of feet which the grade rises or falls in a hundred feet and which will enable an engineer to roughly survey a road much quicker than can be done in the ordinary way.

Referring to the accompanying drawings, which are made a part hereof and on which similar reference characters indicate similar parts, Fig. 1 is a view of the clinometer attached to the inside of a motor vehicle, Fig. 2 is a front view of the device, and Fig. 3 a vertical section on line 3—3 of Fig. 2.

In the drawings numeral 10 indicates a plate to which may be attached a frame or housing portion 11 as by means of screws 12. The plate 10 is provided with eyes 13 so as to be fastened by screws or hooks to the side of a motor vehicle as between the front door 14 and the rear window 15. Rotatably mounted in the housing 11 is a shaft 16, this shaft being journaled in the rear and front sides of the housing and held against forward axial movement by means of a cotter pin or similar device 17. The upper front portion of the plate of the housing is provided with a graduated plate 18 either secured thereto or made integral therewith, as shown. The plate 18 is graduated to indicate any desired data such as the percentage of grade on the road being surveyed or the number of feet in a hundred feet in which the grade rises or falls. Obviously the graduation can be worked out to indicate any desired result. A pointer 19 is securely fastened to the front end of the shaft 16. The lower end of the pointer bends out to provide a shelf or plate 20 to which a level may be attached. The spirit level, as shown, consists of a tube 21 having a bulb 22 filled with liquid. The casing 21 is secured to the shelf 20 by means of screws 23 and 24, the casing 21 being held between nuts 25 and 26 on these screws. By means of the nuts 25 and 26 the level may be accurately adjusted so that it will be at right angles to the axis of the pointer 19. This adjustment also serves to position the level so that the bulb will be at the center line in the tube when the pointer is at zero mark and the car is standing on level ground, irrespective of whether the plate 10 is exactly perpendicular or not. A bracket 27 depends from the shaft 16 and is clamped to it by means of a screw 28 which passes axially up through the bracket and engages the shaft 16. The screw 28 may be loosened so as to permit relative rotary motion between the shaft 16 and the bracket to adjust the pointer 19 manually to provide a rough adjustment.

A pin 29 is secured to one side of the frame 11 and passes loosely through a hole in the lower end of the bracket 27 and is threaded on its outer end to receive a milled nut 30. The end of the nut engages the side of the bracket 27 to hold the bracket against movement in one direction and the compression spring 31 positioned between the other side of the bracket and the side of the frame urges the bracket into contact with the milled nut. The milled nut provides means for finely adjusting the pointer 19 so as to bring the bubble in the level to the center position. When the level is brought to its position and the automobile or other vehicle to which the device is attached is on level ground the center of the pointer 19 should be at the zero mark on the plate 18. If the vehicle is not on level ground the center line on the pointer will indicate a mark at the right or left of the zero mark to indicate on the graduated plate 18 the degree of rise or fall in the grade to indicate the percentage of grade or any other information which the graduation on the plate 18 indicates.

In operation the level 21 is first accurately adjusted by means of the nuts 25 and 26 to position the bubble in the level exactly on the center line when the center line of the pointer 19 is at zero on the graduations and the car is standing on level ground. When the car is moved to a road which has a grade either rising or falling, the bubble in the level will move, of course, to the high siding of the level. If it is a very slight grade adjustment of the milled nut 30 may be sufficient to swing the pointer 19 far enough to bring the bubble back to center line, if so this adjustment is all that need be made and when the level is read the engineer may note the position of the pointer and record the data indicated thereby. If the grade is a very considerable one adjustment of the milled nut 30 will not be sufficient to bring the level to horizontal position. The screw 28 is therefore loosened and the pointer 19 manually swung to bring the bubble in the level approximately to the center line. This is not a very accurate or fine adjustment, however, when the approximate position is secured the screw 28 is tightened and the final adjustment made by means of the milled nut 30. In either case the adjustment may be quickly made and an engineer may make and record a great many positions along the road in a very short period of time and thus make a preliminary survey of many miles of road in less time than he could ordinarily make a few hundred yards by the old method and at much less effort.

It will be obvious to those skilled in the art that various changes may be made in my device without departing from the spirit of the invention and therefore I do not limit myself to what is shown in the drawings and described in the specification, but only as indicated in the appended claims.

Having thus fully described my said invention, what I claim as new and desire to secure by Letters Patent, is:

1. A clinometer adapted for use with a motor vehicle comprising a base plate having a housing mounted thereon, said housing being provided with a graduated scale, a shaft rotatably mounted in said housing, a pointer fixed on the front end of said shaft and adapted to rotate therewith and provided with a depending shelf projecting from its lower edge, an adjustable spirit level secured to said shelf, and means for engaging said shaft whereby the rotation of said pointer may be controlled, substantially as set forth.

2. A clinometer comprising a housing having a graduated scale provided thereon, a shaft rotatably mounted in said housing, a pointer fixed to the front end of said shaft and adapted to rotate therewith, a spirit level adjustably secured to said pointer, a bracket depending from and adapted to engage said shaft, and adjustable means for holding said bracket in position relative to said housing thereby controlling the position of the pointer, substantially as set forth.

3. A clinometer adapted for use with a motor vehicle comprising a housing provided with a scale on one face, a shaft rotatably mounted in said housing, a pointer fixed to one end of said shaft and adapted to rotate therewith and having a spirit level adjustably mounted on its lower end, a bracket mounted on said shaft, said bracket having means for locking it to said shaft, and means for connecting said bracket to the housing and swinging it with respect to said housing thereby controlling said pointer, substantially as set forth.

In witness whereof, I have hereunto set my hand at New Lexington, Ohio, this 6th day of May, A. D. nineteen hundred and thirty.

JOHN AVERY.